G. MACLOSKIE.
VALVE.
APPLICATION FILED SEPT. 20, 1912.

1,173,672.

Patented Feb. 29, 1916.

WITNESSES:
J. Earl Ryan
J. Elbi Elen

INVENTOR:
GEORGE MACLOSKIE,
BY
HIS ATTORNEY

THE COLUMBIA PLANOGRAPH CO., WASHINGTON, D. C.

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

VALVE.

1,173,672.  Specification of Letters Patent.  Patented Feb. 29, 1916.

Application filed September 20, 1912. Serial No. 721,430.

*To all whom it may concern:*

Be it known that I, GEORGE MACLOSKIE, a citizen of the United States, residing at Schenectady, county of Schenectady, State of New York, have invented certain new and useful Improvements in Valves, of which the following is a specification.

My invention relates particularly to cam controlled puppet valves, and the object of my invention is to provide such valves generally with an improved supporting and carrying means whereby the wear of the parts is automatically compensated for and has no effect on the proper seating of the valve.

I accomplish this object by carrying the valve proper on a stem as heretofore; however, I propose to support and carry the stem solely by the operating cam and a spring pressed abutment, which preferably engage the stem at opposite ends so as to move it in directions parallel to its longitudinal axis. I prefer to provide ball and socket engagements with the ends of the stem and to arrange the spring pressed abutment in such a manner that it tends to close the valve. Any wear caused by the use of the valve is automatically compensated for by the spring pressed abutment.

Figure 1:
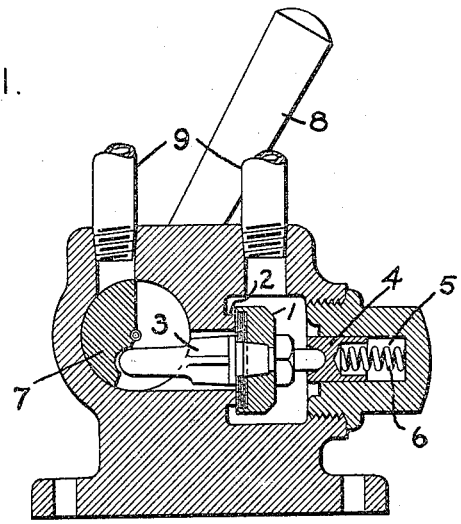
Figure 2:
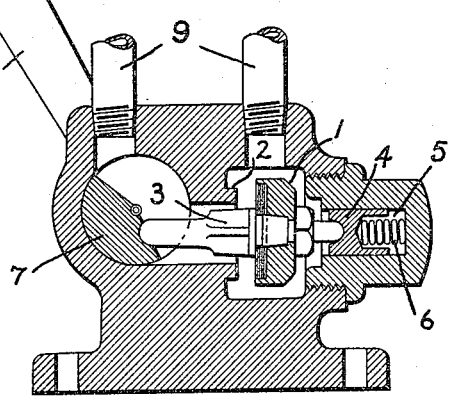

Figure 1 is a sectional view of a construction involving my invention, the valve being seated. Fig. 2 is a similar view of the same construction, the valve being open.

A valve member 1 has a seat 2, upon which it is adapted to rest when the valve is closed. The valve 1 is carried by a stem 3. This construction is common. To carry one end of the stem, I provide a movable abutment 4 having a ball and socket engagement therewith. This abutment may slide in the chamber 5 and is pressed toward the stem by the spring 6. The other end of the stem has a ball and socket engagement with the abutment or rotating member 7 which is connected in this case to a handle 8. These abutments 4 and 7 alone carry the valve by carrying the stem 3. When the handle, and hence the cam 7, are in the position shown in Fig. 1, the valve is held on its seat by means of the spring 6. The movement of the handle 8 to the position shown in Fig. 2 forces the stem 3 to the right, compressing the spring and unseating the valve 1. Thus, a passageway is opened between the ports 9. When the handle 8 is returned to the position shown in Fig. 1, the spring 6 causes the stem 3 to closely follow the cam 7 until the valve 1 is completely seated.

It will be apparent that all wear in this construction is automatically compensated for by the spring 6 which always maintains a close engagement between the abutments and the ends of the stem 3.

What I claim as new and desire to secure by Letters Patent of the United States, is:—

1. The combination of a valve seat, a puppet valve to seat thereon, a stem carrying the valve, and means for carrying the stem consisting of an abutment spring pressed against a portion of the stem and tending to move it in one direction generally parallel to the line of movement thereof and another abutment engaging another portion of the stem adapted to move it in the opposite direction and movable at an angle to the general line of movement of the valve for controlling the seating thereof.

2. The combination of a valve seat, a valve to seat thereon, a stem carrying the valve, and means for carrying the stem consisting of an abutment spring pressed against and having a ball and socket engagement with one end of the stem and another abutment having a ball and socket engagement with the opposite end of the stem and revoluble about a center for controlling the position of the valve.

In witness whereof, I have hereunto set my hand this 17th day of September, 1912.

GEORGE MACLOSKIE.

Witnesses:
 BENJAMIN B. HULL,
 HELEN ORFORD.

Copies of this patent may be obtained for five cents each, by addressing the "Commissioner of Patents, Washington, D. C."